United States Patent [19]

Schafheutle et al.

[11] Patent Number: 5,109,091

[45] Date of Patent: Apr. 28, 1992

[54] COPOLYMERS CONTAINING CARBOXYL GROUPS, THEIR PREPARATION, AND THEIR USE AS THICKENERS

[75] Inventors: Markus A. Schafheutle, Hochheim/Main; Paul G. Becker, Wiesbaden, both of Fed. Rep. of Germany

[73] Assignee: Hoechst AG, Fed. Rep. of Germany

[21] Appl. No.: 746,108

[22] Filed: Aug. 15, 1991

[30] Foreign Application Priority Data

Aug. 18, 1990 [DE] Fed. Rep. of Germany ....... 4026239

[51] Int. Cl.$^5$ .................. C08F 26/02; C08L 39/00; C08L 33/08; C08L 33/02
[52] U.S. Cl. .................. 526/301; 524/555; 524/561; 524/556
[58] Field of Search .......................... 526/301

[56] References Cited

U.S. PATENT DOCUMENTS

Re. 33,156  1/1990  Shay et al. .................. 526/301

Primary Examiner—Joseph L. Schofer
Assistant Examiner—Wu C. Cheng
Attorney, Agent, or Firm—Bierman and Muserlian

[57] ABSTRACT

The invention relates to copolymers containing carboxyl groups and having a thickener action and also containing, inter alia, units (a) and/or (b) and/or (c) derived from monoethylenically unsaturated monomers of the formula (I)

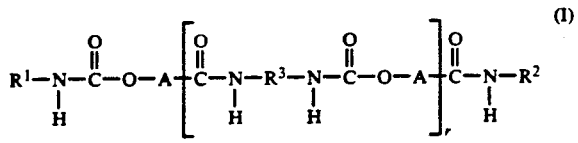

and/or from polyunsaturated monomers of the formula (II)

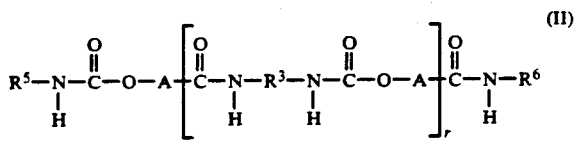

and/or from urethane group-containing monomers of the formula (III)

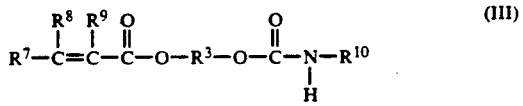

where only one of the two radicals $R^1$ and $R^2$ in the formula (I) is ethylenically unsaturated, while both radicals $R^5$ and $R^6$ in the formula (II) are ethylenically unsaturated.

11 Claims, No Drawings

COPOLYMERS CONTAINING CARBOXYL GROUPS, THEIR PREPARATION, AND THEIR USE AS THICKENERS

A number of polymers which can be employed as thickeners are already known. A distinction can be made between essentially three groups, namely modified natural polysaccharides, such as cellulose, polyurethane block copolymers and polyacrylates.

The polyurethane block copolymers have high resistance to hydrolysis and approximately Newtonian viscosity in aqueous solution. However, they have the disadvantage of excessively low viscosity at very low shear gradients, which means that water-thinnable emulsion paints easily separate out. Furthermore, the wet film does not have high surface quality, and thick films tend to run.

Polyacrylate thickeners are polyelectrolytes which are simultaneously microgels. In aqueous solution, they exhibit non-Newtonian behavior, which means that the solution has high viscosity at low shear gradients and low viscosity at high shear gradients. However, a disadvantage of these thickeners is the large number of carboxyl groups, which have an adverse effect on the water resistance of the finished coatings.

The introduction of hydrophilic and simultaneously amphiphilic side chains, as described in EP-A 121 230, allows the number of carboxyl groups to be reduced and thus the water resistance to be increased. The amphiphilic side chains comprise esters of polymerizable compounds and nonionic surfactants. They are copolymerized into the polyacrylate in amounts of between 0 and 30 % by weight.

EP-A 173 109 describes a method of improving the resistance of the polyacrylates to hydrolysis by bonding the OH-terminated surfactants to the main polymer chain not in the form of esters, but instead via a urethane bond.

It has now been found that the introduction of block copolyurethane side chains having amphiphilic properties and optionally containing additional short side chains containing urethane groups into the thickener polyacrylate considerably increases the viscosity of the latex emulsion to be thickened and simultaneously retains the non-Newtonian properties of the microgels in the thickened latex emulsion.

The invention therefore relates to a copolymer containing carboxyl groups and having a thickener action in aqueous systems which has an acid number of at least 43 mg of KOH/g and, in addition to units derived from monomers containing carboxyl groups, also contains units derived from nonionic monomers, optionally containing amphiphilic groups, and optionally from crosslinking monomers, wherein the copolymer additionally contains units derived from (a) monoethylenically unsaturated (macro)monomers containing urethane groups, of the formula (I)

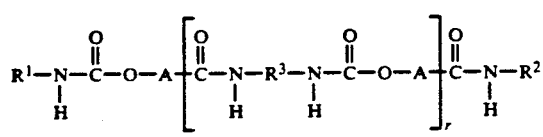

in which $R^1$ and $R^2$, independently of one another, are saturated hydrocarbon radicals having 3 to 25 carbon atoms and optionally also containing hetero atoms or groups containing hetero atoms, or are monoethylenically unsaturated hydrocarbon radicals having up to 15 carbon atoms and optionally containing hetero atoms or groups containing hetero atoms, with the proviso that one of the two radicals $R^1$ and $R^2$ is monoethylenically unsaturated, $R^3$ is a divalent, saturated hydrocarbon radical having 2 to 30 carbon atoms and optionally containing hetero atoms or groups containing hetero atoms, preferably an alkylene radical having 2 to 25 carbon atoms, an arylene radical having 6 to 12 carbon atoms or an arylalkylidene radical having 6 to 30 carbon atoms, A is the

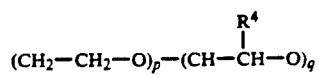

radical in which $R^4$ is $(C_1-C_6)$-alkyl, preferably methyl, and p is a number from 2 to 300, preferably from 10 to 100, and q is a number from 0 to 300, preferably from 0 to 10, and r is a number from 0 to 10, preferably 0 or 1, and/or (b) polyunsaturated (macro)monomers containing urethane groups, of the formula (II)

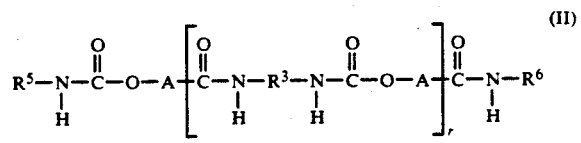

in which $R^3$, A and r are as defined above under the formula (I), and $R^5$ and $R^6$, independently of one another, are each a monoethylenically unsaturated hydrocarbon radical having 3 to 15 carbon atoms and optionally containing hetero atoms or groups containing hetero atoms, and/or c) monomers containing urethane groups, of the formula (III)

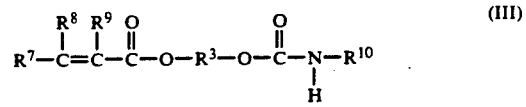

in which $R^3$ is as defined under the formula (I), $R^7$, $R^8$ and $R^9$, independently of one another, are hydrogen or $(C_1-C_6)$-alkyl, preferably methyl, and $R^{10}$ is an aliphatic or cycloaliphatic radical having 3 to 25 carbon atoms, preferably 6 to 18 carbon atoms, an aryl radical having 6 to 12 carbon atoms, preferably 6 carbon atoms, or an arylalkyl radical having 7 to 20 carbon atoms, preferably 7 to 15 carbon atoms.

The invention furthermore relates to a process for the preparation of these copolymers and to aqueous systems, in particular paint formulations, containing these copolymers.

The copolymers according to the invention preferably have an acid number of from 43 to 180 mg of KOH/g and provide an aqueous dispersion (30%) with a viscosity of from 1.5 to 100 mPas, preferably 1.5 to 20 mPas, at 20° C, and a pH of 2.

In the above formula (I), one of the two radicals $R^1$ and $R^2$ is preferably alkyl having 3 to 25 carbon atoms, while the other radical has the formula (IV) or (V)

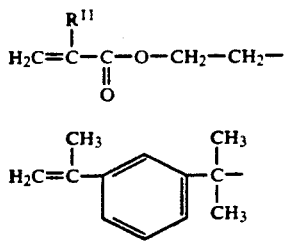

where, in the formula (IV), $R^{11}$ is hydrogen or a $(C_1-C_6)$-alkyl radical, preferably a methyl radical.

The (macro)monomers of the above formulae (I) and (II) which result in the units (a) and (b) can be prepared, for example, by reacting diisocyanates of the formula $OCN-R^3-NCO$, in which $R^3$ is as defined above, with poly(alkylene) glycols of the formula

in which A is also as defined above, and with monoisocyanates of the formula $R^*NCO$ ($R^*=R^1$, $R^2$, $R^5$ and/or $R^6$, see above) in an appropriate mixing ratio. Depending on the type of this monoisocyanate, monoethylenically unsaturated compounds (I) or diethylenically unsaturated compounds (II) or corresponding mixtures are obtained.

The monomers of the formula (III) containing urethane groups can be obtained, for example, by reacting monoisocyanates of the formula $R^{10}NCO$ with monoethylenically unsaturated OH-terminated compounds of the formula

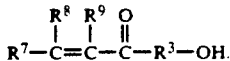

In a preferred embodiment of the invention, the copolymer additionally contains, in addition to the units (a), (b) and/or (c), (d) units derived from monoethylenically unsaturated monomers containing at least one carboxyl group and having from 3 to 14 carbon atoms, (e) units derived from esters of monoethylenically unsaturated carboxylic acids, preferably monocarboxylic acids, with $(C_1-C_{25})$-alcohols, preferably $(C_1-C_8)$-alcohols, (f) if desired units derived from an amphiphilic $\alpha,\beta$-ethylenically unsaturated carboxylic acid ester of the formula (VI)

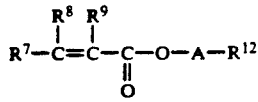

in which

A, $R^7$, $R^8$ and $R^9$ are as defined under the formula (I), and $R^{12}$ is hydrogen or a hydrocarbon radical having 1 to 30 carbon atoms and optionally also containing hetero atoms or groups containing hetero atoms, preferably a $(C_2-C_{20})$-alkyl radical, which may optionally be partially or fully fluorinated, a phenyl radical or a $(C_7-C_{42})$-alkylphenyl radical, (g) if desired units derived from monoethylenically unsaturated monomers containing urethane groups, other than (a) and (c), (h) if desired units derived from other monoethylenically unsaturated monomers, other than (a) and (c) to (g), preferably vinyl esters, vinylaromatic compounds, unsaturated nitriles, unsaturated sulfonic acids or derivatives thereof, (i) if desired units derived from polyethylenically unsaturated compounds, other than (b), and (j) if desired units derived from molecular weight regulators.

The units (d) are preferably derived from monoethylenically unsaturated $(C_3-C_5)$-monocarboxylic acids, monoethylenically unsaturated $(C_4-C_6)$-dicarboxylic acids or monoesters thereof with aliphatic $(C_1-C_8)$-alcohols, or mixtures of these monomers, in particular methacrylic acid, acrylic acid, crotonic acid, maleic acid, fumaric acid, monoalkyl maleate, monoalkyl fumarate, itaconic acid or mixtures thereof. Particular preference is given to acrylic acid and/or methacrylic acid (=(meth)acrylic acid) and crotonic acid.

Examples which may be mentioned of compounds which result in units (e) are: esters of unsaturated mono- and dicarboxylic acids with alcohols, such as acrylic and methacrylic acid esters, for example ethyl acrylate, dodecyl(meth)acrylate and lauryl (meth)acrylate, crotonic acid esters with $(C_1-C_8)$-alcohols, such as, for example, methyl crotonate and 2-ethylhexyl crotonate, or maleic or itaconic acid esters with $(C_1-C_8)$-alcohols, such as, for example, dimethyl maleate, dibutyl maleate, di-2-ethylhexyl maleate and dimethyl itaconate, or (meth)acrylic acid monoesters with diols or triols, such as, for example, ethylene glycol, 1,4-butenediol, 1,6-hexanediol, glycerol and trimethylolpropane, or with terminal epoxides. Preference is given to lower (meth)acrylic acid esters, such as the methyl, ethyl, isopropyl, isobutyl, tert.-butyl and n-butyl esters. Particular preference is given to the methyl and ethyl esters.

Compounds of the above formula (VI) which result in units (f) are disclosed in EP-A 121 230, to which reference is hereby made. Preferred representatives are given by this formula (VI) in which $R^7$, $R^8$ and $R^9$, independently of one another, are hydrogen or methyl, q in A is 0, p in A is from 2 to 50, and $R^{11}$ is defined as follows: n- or iso($C_2-C_{30}$)-alkyl, preferably $(C_{12}-C_{20})$-alkyl, in particular $(C_{16}-C_{18})$-alkyl, such as, for example, n- or isooctyl, n- or isodecyl, n- or isododecyl, n- or isohexadecyl, n- or isooctadecyl, or mixtures of these radicals, so that, for example, crotonic acid esters containing 10 ethylene oxide units and one $C_{12}$-alkyl radical or containing 20 ethylene oxide units and one isooctyl radical or containing 50 ethylene oxide units and one $C_{18}$-alkyl radical can be formed, or monoalkylphenyl containing n- or iso-$(C_4-C_{12})$-alkyl groups, preferably n- or iso-$(C_8-$ or $C_9)$-alkyl groups, such as, for example, isooctylphenyl or isononylphenyl, using which, for example, crotonic acid esters containing 5 ethylene oxide units and one isooctylphenyl radical or containing 11 ethylene oxide units and one isononylphenyl radical can be formed, or dialkylphenyl containing n- or iso-$(C_4-C_{12})$-alkyl groups, such as, for example, diisobutylphenyl, diisooctylphenyl or diisononylphenyl, using which, for example, crotonic acid esters containing 20 ethylene oxide units and one diisobutylphenyl radical or containing 50 ethylene oxide units and one diisooctylphenyl radical or containing 80 ethylene oxide units and one diisononylphenyl radical can be formed, or trialkylphenyl containing n- or iso-$(C_4-C_{12})$-alkyl groups, such as, for example, triisobutylphenyl, triisooctylphenyl or triisononylphenyl, using which, for example, crotonic acid esters containing 11 ethylene oxide units and one triisobutylphenyl radical or containing 23 ethylene oxide units and one triisononylphenyl radical or containing 50 ethylene oxide units and one triisooctylphenyl radical can be formed.

It is of course again possible here, as in the case of the other monomers, to employ mixtures of said monomers, but it must be taken into account that the compounds to be employed are generally prepared from technical-grade precursors which may have a certain distribution latitude, for example with respect to their degree of oxethylation or their molecular weight distribution.

Preferred representatives which result in units (g) are products of the reaction of α) a monoethylenically unsaturated monoisocyanate, such as isocyanatoethyl (meth)acrylate or m-isocyanatoisopropyl-α-methylstyrene, with a monohydric alcohol, which has either an amphiphilic or nonamphiphilic character, β) products of the reaction of OH-functional, monoethylenically unsaturated alkyl esters containing diisocyanate groups and monohydric alcohols having an amphiphilic or nonamphiphilic character, or γ) mixtures of these reaction products.

Compounds as in α) are described, for example, in EP-A 173 109, to which reference is made here. The amphiphilic alcohols mentioned are, in particular, ethylene oxide-propylene oxide block copolymers (polyethylenepropylene glycols) or oxethylated alcohols or phenols, these amphiphilic alcohols preferably having the formula (VII)

$$R^{12}-A-OH \quad \text{(VII)}$$

in which $R^{12}$ and A are as defined above under the formula (VI).

The nonamphiphilic alcohols are, for example, ethylene oxide polymers (polyethylene glycols) or $C_2-C_{20}$-alcohols.

The OH-functional, monoethylenically unsaturated alkyl esters as in β) preferably have the formula (VIII)

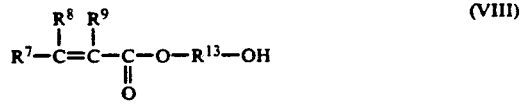

in which $R^7$, $R^8$ and $R^9$ are as defined under the formula (VI), and $R^{13}$ is a divalent hydrocarbon radical, preferably having an aliphatic character, having 2 to 10 carbon atoms, preferably 2 to 6 carbon atoms.

The diisocyanates mentioned above under β) are compounds known from the polyurethane or paints sector, such as aliphatic, cycloaliphatic or aromatic diisocyanates. They preferably have the formula $R^3(NCO)_2$ where $R^3$ is as defined under the formula (I). Examples of diisocyanates of this type which are preferably employed are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 4,4'-diisocyanato-2,2-dicyclohexylpropane, 1,4-diisocyanatobenzene, 2,4- and 2,6-diisocyanatotoluene or mixtures of these isomers, 4'- and 2,4'-diisocyanatodiphenylmethane, 4,4'-diisocyanato-2,2-diphenylpropane, m- and p-xylylene diisocyanate, and mixtures comprising these compounds.

Of the compounds which result in units (h), the following are preferably suitable: vinyl esters of $(C_1-C_{12})$-carboxylic acids, such as acetic acid, propionic acid, 2-ethylhexanoic acid, Versatic acid 9, Versatic acid 10 and lauric acid, furthermore vinyl ethers, unsaturated aromatic compounds, such as styrene or vinyltoluene, unsaturated nitriles, such as (meth)acrylonitrile, or unsaturated amides, such as (meth)acrylamide and N-methylol(meth)acrylamide, and corresponding ethers, such as N-methylol(meth)acrylamide methyl or butyl ether, hydroxyethyl or hydroxypropyl (meth)acrylamide, 2-t-butylaminoethyl methacrylamide, N,N-dimethylaminoethyl methacrylamide, or unsaturated sulfonic acids, preferably ethylenesulfonic acid or acrylamidopropanesulfonic acid, or preferably salts thereof, in particular alkali metal or ammonium salts.

The polyethylenically unsaturated compounds which give the units (i) generally have two or three double bonds. Examples which may be mentioned here are: diallyl phthalate, diallyl maleate, divinylbenzene, ethanediol di(meth)acrylate, butanediol di(meth)acrylate, hexanediol di(meth)acrylate, pentaerythritol triacrylate, trimethylolpropane triacrylate, tetraethylene glycol diacrylate, tripropylene glycol diacrylate, trimethylolpropane trimethacrylate, tetraallyloxyethane and N,N'-methylenebis(meth)acrylamide.

Regulators which result in units (j) at the chain end of the copolymer may be any compounds which have free radical-transferring properties. Examples of these are preferably mercaptans (monofunctional and polyfunctional), such as, for example, n- and t-dodecyl mercaptan, tetrakismercaptoacetylpentaerythritol, thioglycolic acid and the like. However, it is also possible to use other compounds as regulators, such as, for example, toluene, trichlorobromomethane and tetrachloromethane.

The amount of these units (a) to (j) in the copolymer according to the invention may vary within a relatively broad range. In general, this amount is (a) from 0 to 30% by weight, preferably from 0 to 10% by weight, (b) from 0 to 20% by weight, preferably from 0 to 8% by weight, (c) from 0 to 30% by weight, preferably from 0 to 10% by weight, where the amount of one of these three units must not be zero, (d) from 1 to 55% by weight, preferably from 3 to 30% by weight, (e) from 30 to 85% by weight, preferably from 30 to 60% by weight, (f) from 0 to 30% by weight, preferably from 0 to 10% by weight, (g) from 0 to 60% by weight, preferably from 0 to 20% by weight, (h) from 0 to 40% by weight, preferably from 0 to 35% by weight, (i) from 0 to 20% by weight, preferably from 0 to 10% by weight, where the total amount of (b) and (i) must not exceed 20% by weight, preferably 10% by weight, and (j) from 0 to 5% by weight, preferably from 0 to 2% by weight. Each of these percentages is based on the copolymer.

The copolymers according to the invention can be prepared, for example, by conventional free radical-initiated solution copolymerization in conventional solvents or by conventional emulsion copolymerization in an aqueous medium. In the case of preparation by emulsion copolymerization, the solids content of the resultant dispersion is preferably between 10 and 55% by weight. The preferred preparation method is emulsion copolymerization.

In the case of the preferred emulsion copolymerization, the compounds corresponding to (a), (b) and/or (c), (d) and (e) and, if desired, (f) to (j) are copolymerized in the respective amounts in the aqueous phase at temperatures of, usually, from 50° to 100° C., preferably from 75° to 100° C., in the presence of conventional initiators and preferably also in the presence of suitable emulsifiers. Examples of suitable initiators, which are usually employed in amounts of 0.01-2% by weight, based on the total amount of monomers, are alkali metal or ammonium persulfates.

Emulsifiers which can be employed for emulsifying the monomers and for stabilizing the emulsion are conventional ionogenic and nonionogenic emulsifiers. Examples of suitable anionic emulsifiers are: alkyl sulfates, alkylaryl sulfates, alkylarylsulfonates, alkali metal and/or ammonium salts of alkyl- or alkylaryl polyglycol ether sulfates. Examples of nonionogenic emulsifiers which may be mentioned here are: oxyethylated fatty alcohols or oxyethylated alkylphenols. The amount of emulsifier is generally 0.3-5% by weight, based on the total weight of the monomers.

If necessary, the thickeners according to the invention can be isolated from the resultant aqueous emulsions or solutions by conventional methods, for example by spray drying.

When selecting the type and amount of the particular monomers, the following, inter alia, should be noted: The crosslinking agents corresponding to (b) and/or (i) frequently increase the thickener capacity or have a positive effect on the rheological properties of the copolymers according to the invention in aqueous systems and are therefore preferably employed in the invention.

The use of molecular weight regulators corresponding to (j) during the copolymerization results in lower molecular weights of the copolymers. The viscosity of the aqueous solutions of such copolymers thus drips compared with unregulated products. In this way, the chances of adjusting the necessary balance between high low-shear viscosity and low high-shear viscosity for specific application systems in a targeted manner can thus be improved.

The thickener capacity of copolymers according to the invention can be additionally modified by (further) addition of ionic or nonionic emulsifiers to the aqueous system, in particular before neutralization of the free acid groups of the copolymer, but also after this is complete. If the thickener employed for thickening an aqueous system containing disperse solids is, for example, 0.01-5% by weight of the copolymer according to the invention (based on the solids), the favorable range for any further amounts of emulsifiers to be added is between 0.01 and 10% by weight (based on the solids).

The copolymers according to the invention are preferably used, as thickeners, in a form which has been partially or fully neutralized with bases, and is water-soluble or water-dispersible to give colloids, for thickening aqueous systems and providing them with specific rheological properties. Whereas the copolymers according to the invention are preferably water-insoluble products in their free acid form, their salts with bases, in particular the alkali metal, ammonium or amine salts, are soluble in water to give a clear solution or, in colloidal form, dispersible in water. When the copolymers are used as thickeners, they are, for example, admixed with the aqueous system to be thickened initially as a low-viscosity solution in a suitable solvent or as a low-viscosity aqueous copolymer dispersion, and the resultant mixture, including, for example, all pigments and paint constituents present therein, is partially or fully neutralized by addition of a base or rendered alkaline, for example to a pH of 5-10.5, in particular 7-9.5. However, the copolymers are preferably admixed as aqueous pastes with the aqueous systems of be thickened.

Preferred areas of application for the copolymers according to the invention are the thickening and viscosity-adjustment of disperse aqueous systems, such as, preferably, of aqueous metallic base coats, emulsion paints, gloss emulsion paints, textile printing pastes and paper printing pastes, furthermore of biocidal active ingredient dispersions for crop protection and pest control, liquid fertilizers, emulsion cleaners, stripping pastes, deicers or cosmetic preparations. A further interesting use of the copolymers according to the invention is in the textile industry as sizing agents or sizing agent components which can easily be washed out by alkaline liquors.

The amounts used of the copolymers according to the invention are not crucial. However, when used as thickeners, they are preferably in the range of from 0.01 to 5% by weight of copolymer, based on the aqueous system to be thickened.

The invention is described in greater detail by means of the examples which follow.

EXAMPLE 1

1.1 Synthesis of the surface-active monomer (a) containing urethane groups and of the bifunctional crosslinking agent (b) containing urethane groups (→r in the formulae (I)/(II)=0) as a mixture.

285.1 g of polyethylene glycol 200 (molecular weight 200) were dried at 100°-110° C. in a stream of nitrogen and, after 2 hours, cooled to 60° C. A mixture of 425.3 g of stearyl isocyanate and 289.6 g of m-isocyanatoisopropyl-α-methylstyrene were metered in over the course of 30 minutes. The temperature was increased again to 100° C., and the mixture was stirred at this temperature until isocyanate could no longer be titrated. Polyethylene glycols of higher molecular weight (200–10000) were reacted analogously to this procedure.

1.2 Synthesis of the surface-active monomer (a) containing urethane groups and containing more than one hydrophobic group, and of the bifunctional crosslinking agent (b) containing urethane groups (r in the formulae (I)/(II)≠0).

741.3 g of polyethylene glycol 1000 were dried at 100°-110° C. in a stream of nitrogen and, after 2 hours, cooled to 60° C. 65.4 g of hexamethylene diisocyanate were added over the course of 5 minutes. The temperature was increased to 100° C. and kept there until isocyanate could no longer be titrated. The mixture was again cooled to 60° C., and a mixture of 115 g of stearyl isocyanate and 78.3 g of m-isocyanatoisopropyl-α-methylstyrene was metered in over the course of 30 minutes. The reaction mixture was stirred at 100° C. until isocyanate could no longer be titrated.

1.3 Synthesis of nonamphiphilic monomer (c) containing urethane groups 1000 g of 2-hydroxyethyl methacrylate were warmed to 60° C., and 915.3 g of phenyl isocyanate were metered in. The mixture was stirred at 60° C. until isocyanate could no longer be titrated.

In the same way, monomers were prepared using cyclohexyl isocyanate and stearyl isocyanate.

1.4 Preparation of the copolymer according to the invention

Sample 1

44.5 g of a monomer as per Example 1.1 were emulsified in a solution of 2.5 g of ®Hostapal BV (alkylaryl polygylcol ether sulfate, sodium salt) and 186 g of water using a polyethylene glycol having a molecular weight of 1000 (→(a)+(b)), 132.7 g of methacrylic acid (→(d)) and 152.5 g of ethyl acrylate (→(e)). 10% of this emulsion, together with 16 ml of a solution comprising 0.8 g of ammonium peroxodisulfate in 50 ml of water, were added to a liquor comprising 2.5 g of Hostapal BV in 522 g of water at 80° C. 20 minutes after the addition, the remainder of the monomer emulsion and the remainder of the initiator solution were metered in in parallel over the course of 2 hours. After a postreaction lasting 2.5 hours, the dispersion was filtered through a KG 0/400 filter plate. The thickener solution was obtained by subsequent partial or complete neutralization using bases.

Samples 2 to 9

In the same way as for Sample 1, Samples 2 to 9 were likewise prepared in emulsion form by analogous emulsion polymerization from the monomer constituents and amounts in each case listed in Table 1. The crosslinking agents used in some cases (→(i)) were in each case admixed with the monomer mixture in the stated amounts, based on the total molar amount of the monomers. Sample 9 was used for comparison purposes.

Table 1 also shows the viscosities of the respective copolymer solutions (1% solids; neutralized with ammonia) at low and high shear gradients. Comparison with Sample 9 shows the surprising improvement in the case of the copolymers according to the invention.

(a) monoethylenically unsaturated (macro)monomers containing urethane groups, of the formula (I)

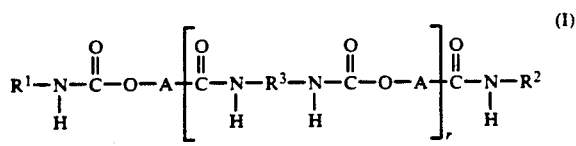

in which

R$^1$ and R$^2$, independently of one another, are saturated hydrocarbon radicals having 3 to 25 carbon atoms and optionally also containing hetero atoms or groups containing hetero atoms, or are monoethylenically unsaturated hydrocarbon radicals having up to 15 carbon atoms and optionally containing hetero atoms or groups containing hetero atoms, with the proviso that one of the two radicals R$^1$ and R$^2$ is monoethylenically unsaturated, R$^3$ is a divalent, saturated hydrocarbon radical having 1 to 30 carbon atoms and optionally containing hetero atoms or groups containing hetero atoms, A is the

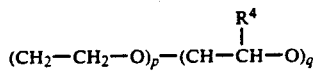

radical in which R$^4$ is (C$_1$-C$_6$)-alkyl, and p is a number from 2 to 300, and q is a number from 0 to 300, and r is a number from 0 to 10, and/or (b) polyunsaturated (macro)monomers containing urethane groups, of the formula (II)

(II)

TABLE 1

Composition of Copolymers 1 to 9 in mol %, based on the total monomer mixture without regulator, and the rheology of the corresponding solutions

| | Composition | | | | | | | Rheology | |
|---|---|---|---|---|---|---|---|---|---|
| | Amphiphilic urethane monomer[1] | Urethane comonomer[2] | Methacrylic acid | Ethyl acrylate | Amphiphilic crotonic ester[3] | Crosslinking agent[4] | pH of the solution | Viscosity (0.01/s) [Pa s] | Viscosity (10000/s) [Pa s] |
| No.: | (a) + (b) | (c) | (d) | (e) | (f) | (i) | | | |
| 1 | 0.5 | — | 50 | 49.5 | — | — | 7.27 | 73.65 | 0.04 |
| 2 | 0.3 | — | 50 | 49.7 | — | — | 7.38 | 5.6 | 0.06 |
| 3 | — | 0.75 | 50 | 48.6 | 0.5 | 0.15 | 8.49 | 39.3 | 0.06 |
| 4 | — | 0.5 | 50 | 48.85 | 0.5 | 0.15 | 7.25 | 37.3 | 0.04 |
| 5 | — | 1 | 50 | 48.4 | 0.5 | 0.10 | 7.31 | 53.8 | 0.04 |
| 6 | — | 1.5 | 50 | 48 | 0.5 | 0.15 | 7.45 | 37.32 | 0.04 |
| 7 | — | 1 | 50 | 48.5 | 0.5 | 0.15 | 7.44 | 39.27 | 0.04 |
| 8 | — | — | 43.6 | 56.3 | — | 0.05 | 8.06 | 13.5 | 0.07 |
| 9[5] | — | — | 54.4 | 44.1 | 1.5 | — | 8.14 | 0.2 | 0.02 |

[1] as in Example 1.1
[2] prepared from 2-hydroxyethyl methacrylate and phenyl isocyanate as per Example 1.3
[3] prepared from ®Genapol T 250 (from fatty alcohol and 25 mol of ethylene oxide) and crotonic acid
[4] diallyl maleate
[5] comparison sample

What is claimed is:

1. A copolymer containing carboxyl groups and having a thickener action in aqueous systems which has an acid number of at least 43 mg of KOH/g and, in addition to units derived from monomers containing carboxyl groups, also contains units derived from nonionic monomers, optionally containing surface-active groups, and optionally from crosslinking monomers, wherein the copolymer additionally contains units derived from

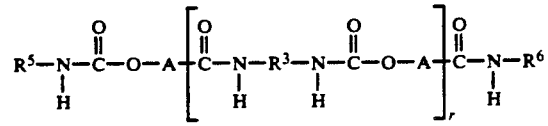

in which R$^3$, A and r are as defined above under the formula (I), and

R$^5$ and R$^6$, independently of one another, are each a monoethylenically unsaturated hydrocarbon radical having 3 to 15 carbon atoms and optionally containing hetero atoms or groups containing hetero atoms, and/or c) monomers containing urethane groups, of the formula (III)

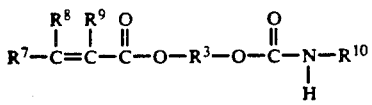

in which $R^3$ is as defined under the formula (I), $R^7$, $R^8$ and $R^9$, independently of one another, are hydrogen or ($C_1$-$C_6$)-alkyl, and $R^{10}$ is an aliphatic or cycloaliphatic radical having 3 to 25 carbon atoms, an aryl radical having 6 to 12 carbon atoms, or an arylalkyl radical having 7 to 20 carbon atoms.

2. A copolymer as claimed in claim 1, wherein the acid number is between 43 and 180 mg of KOH/g and the viscosity (30% strength aqueous dispersion: 20° C., pH 2) is between 1.5 and 100 mPas.

3. A copolymer as claimed in claim 1, wherein, in the formulae (I) and/or (II), $R^3$ is an alkylene radical having 1 to 25 carbon atoms, an arylene radical having 6 to 12 carbon atoms or an arylalkylidene radical having 6 to 30 carbon atoms, $R^4$ in the radical A is methyl, p is a number from 2 to 100 and q is a number from 0 to 10.

4. A copolymer as claimed in claim 1, wherein, in the formula (I), one of the two radicals $R^1$ and $R^2$ is alkyl having 3 to 25 carbon atoms and the other radical has the formula (IV) or (V)

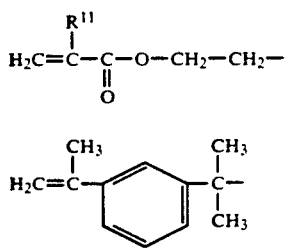

where in the formula (IV), $R^{11}$ is hydrogen or a ($C_1$-$C_6$)-alkyl radical.

5. A copolymer as claimed in claim 1, containing, in addition to the units (a), (b) and/or (c), (d) units derived from monoethylenically unsaturated monomers containing at least one carboxyl group and having from 3 to 14 carbon atoms, (e) units derived from esters of monoethylenically unsaturated carboxylic acids, with ($C_1$-$C_{18}$)-alcohols, (f) surface-active α,β-ethylenically unsaturated carboxylic acid ester of the general formula (VI)

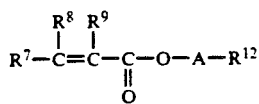

in which

A, $R^7$, $R^8$ and $R^9$ are as defined under the formula (I), and $R^{12}$ is hydrogen or a hydrocarbon radical having 1 to 30 carbon atoms and optionally also containing hetero atoms or groups containing hetero atoms, preferably a ($C_2$-$C_{20}$)-alkyl radical, which may optionally be partially or fully fluorinated, a phenyl radical or a ($C_7$-$C_{42}$)-alkylphenyl radical, (g) optionally units derived from monoethylenically unsaturated monomers containing urethane groups, other than (a) and (c), (h) optionally units derived from other monoethylenically unsaturated monomers, other than (a) and (c) to (g), preferably vinyl esters, vinylaromatic compounds, unsaturated nitriles, unsaturated sulfonic acids or derivatives thereof, (i) optionally units derived from polyethylenically unsaturated compounds, other than (b), and (j) optionally units derived from molecular weight regulators.

6. A copolymer as claimed in claim containing, in addition to the units (a), (b) and/or (c), (d) units which are derived from monoethylenically unsaturated ($C_3$-$C_5$)-monocarboxylic acids, monoethylenically unsaturated ($C_4$-$C_6$)-dicarboxylic acids or monoesters thereof with aliphatic ($C_1$-$C_8$)-alcohols, or mixtures of these monomers.

7. A copolymer as claimed in claim 1, containing, in addition to the units (a), (b) and/or (c), (g) units which are derived from products of the reaction of isocyanatoethyl (meth)acrylate or m-isocyanatoisopropyl-α-methyl-styrene with monohydric alcohols.

8. A copolymer as claimed in claim 1, containing, in addition to the units (a), (b) and/or (c), (i) units which are derived from diallyl maleate, divinylbenzene, diallyl phthalate, butanediol di(meth)acrylate or tetraallyloxyethane.

9. A copolymer as claimed in claim 1, wherein the amount of (a) is 0 to 30% by weight, the amount of (b) is 0 to 20% by weight, the amount of (c) is 0 to 30% by weight, where the amount of one of these three units must not be zero, the amount of (d) is 1 to 55% by weight, the amount of (e) is 30 to 85% by weight, the amount of (f) is 0 to 30% by weight, the amount of (g) is 0 to 60% by weight, the amount of (h) is 0 to 40% by weight, the amount of (i) is 0 to 20% by weight, where the total amount of (b) and (h) must not exceed 20% by weight, and the amount of (j) is 0 to 5% by weight, these percentages in each case being based on the copolymer.

10. An aqueous system containing a copolymer as claimed in claim 1.

11. An aqueous system containing a copolymer as claimed in claim 1, wherein some or all of the carboxyl groups of the copolymer have been neutralized.